(12) United States Patent
Cova

(10) Patent No.: US 9,154,168 B2
(45) Date of Patent: Oct. 6, 2015

(54) SIGNAL PEAK-TO-AVERAGE POWER RATIO (PAR) REDUCTION

(71) Applicant: Intel IP Corporation, Santa Clara, CA (US)

(72) Inventor: Armando Cova, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 13/894,268

(22) Filed: May 14, 2013

(65) Prior Publication Data

US 2014/0341315 A1 Nov. 20, 2014

(51) Int. Cl.
*H04B 1/04* (2006.01)
*H04L 27/26* (2006.01)
*H04L 27/34* (2006.01)

(52) U.S. Cl.
CPC .......... *H04B 1/0475* (2013.01); *H04L 27/2626* (2013.01); *H04L 27/3411* (2013.01); *Y02B 60/50* (2013.01)

(58) Field of Classification Search
CPC ................. H04B 1/0475; H04B 1/707; H04B 2201/70706; H04B 1/713; H04B 2001/0433; H04B 2203/5408; H04L 27/2626; H04L 27/2614; H04L 27/2624; H04L 27/368; H04L 27/2623; H04L 27/2618; H04L 27/262; H04L 25/03866; H04L 27/2613; H04L 25/022; H04L 27/2602; H04L 27/2647; H04L 5/0007; H04L 1/0054; H04L 25/03057; H03F 1/0205; H03F 2200/165; H03F 2200/258; H03F 3/24; H03F 1/3247; H03F 1/3294; H03F 2201/3209

USPC ......... 375/262, 271, 285, 290, 295, 296, 297, 375/299, 300, 302, 316, 318, 321, 322, 328, 375/231, 340, 345, 347, 350

See application file for complete search history.

(56) References Cited

U.S. PATENT DOCUMENTS 7,778,348 B2 * 8/2010 Lozhkin ......................... 375/295
8,446,979 B1 * 5/2013 Yee ................................ 375/296

(Continued)

FOREIGN PATENT DOCUMENTS

JP 2013-157955 8/2013 ................ H03F 1/32

OTHER PUBLICATIONS

Baxley, R.J. et al., "Constrained Clipping for Crest Factor Reduction in OFDM", Broadcasting, IEEE Transactions on (vol. 52 , Issue: 4 ), Dec. 2006, pp. 570-575.

(Continued)

*Primary Examiner* — Hirdepal Singh
(74) *Attorney, Agent, or Firm* — Baker Botts L.L.P.

(57) ABSTRACT

A method of reducing a peak to average power ratio (PAR) of a signal may include generating an in-band error signal indicating in-band distortion of a compressed signal and generating an out-of-band error signal indicating out-of-band distortion of the compressed signal. The method may further include applying an in-band gain to the in-band error signal to generate an adjusted in-band error signal and applying an out-of-band gain to the out-of-band error signal to generate an adjusted out-of-band error signal. The method may also include combining the compressed signal with the adjusted in-band error signal and the adjusted out-of-band error signal to generate an output signal. The compressed signal may be combined with the adjusted error signals, and the in-band gain and the out-of-band gain may be based on the output signal such that distortion of the output signal is reduced with respect to distortion of the compressed signal.

18 Claims, 6 Drawing Sheets

(56) References Cited

U.S. PATENT DOCUMENTS

| | | | |
|---|---|---|---|
| 8,548,092 B2* | 10/2013 | Kang et al. | 375/296 |
| 8,804,862 B2* | 8/2014 | Al-Safadi et al. | 375/260 |
| 8,804,870 B2* | 8/2014 | Kim et al. | 375/297 |
| 2003/0064737 A1* | 4/2003 | Eriksson et al. | 455/501 |
| 2011/0092173 A1* | 4/2011 | McCallister et al. | 455/108 |
| 2013/0141160 A1* | 6/2013 | Ohkawara et al. | 330/149 |
| 2013/0195221 A1* | 8/2013 | Lozhkin | 375/297 |
| 2014/0016723 A1* | 1/2014 | Mu et al. | 375/296 |
| 2014/0334572 A1* | 11/2014 | Ozaki et al. | 375/297 |

OTHER PUBLICATIONS

Japanese Office Action issued in Appl. No. 2014-098581; 6 pages with translation.

P. Swaroop et al., "Crest Factor Reduction through In-band and Out-of-Band Distortion Optimization," Radio and Wireless Symposium, Jan. 2008 IEEE, pp. 759-762.

* cited by examiner

SIGNAL PEAK-TO-AVERAGE POWER RATIO (PAR) REDUCTION

FIELD

The embodiments discussed herein are related to reducing a peak-to-average power ratio (PAR) of a signal.

BACKGROUND

A data rate of a signal may be inversely proportional to a peak-to-average power ratio (PAR) (also referred to as a "crest factor") of the signal. Therefore, reducing the PAR of signals may increase the amount of data that may be communicated via the signals over a particular period of time. Additionally, reducing the PAR of the signals may reduce power consumption used to communicate a certain amount of data.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of reducing a peak to average power ratio (PAR) of a signal may include generating an in-band error signal indicating in-band distortion of a compressed signal with respect to an input signal from which the compressed signal is generated and generating an out-of-band error signal indicating out-of-band distortion of the compressed signal with respect to the input signal. The method may further include applying an in-band gain to the in-band error signal to generate an adjusted in-band error signal and applying an out-of-band gain to the out-of-band error signal to generate an adjusted out-of-band error signal. The method may also include combining the compressed signal with the adjusted in-band error signal and the adjusted out-of-band error signal to generate an output signal. The compressed signal may be combined with the adjusted in-band error signal and the adjusted out-of-band error signal, and the in-band gain and the out-of-band gain may be based on the output signal such that distortion of the output signal is reduced with respect to distortion of the compressed signal.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
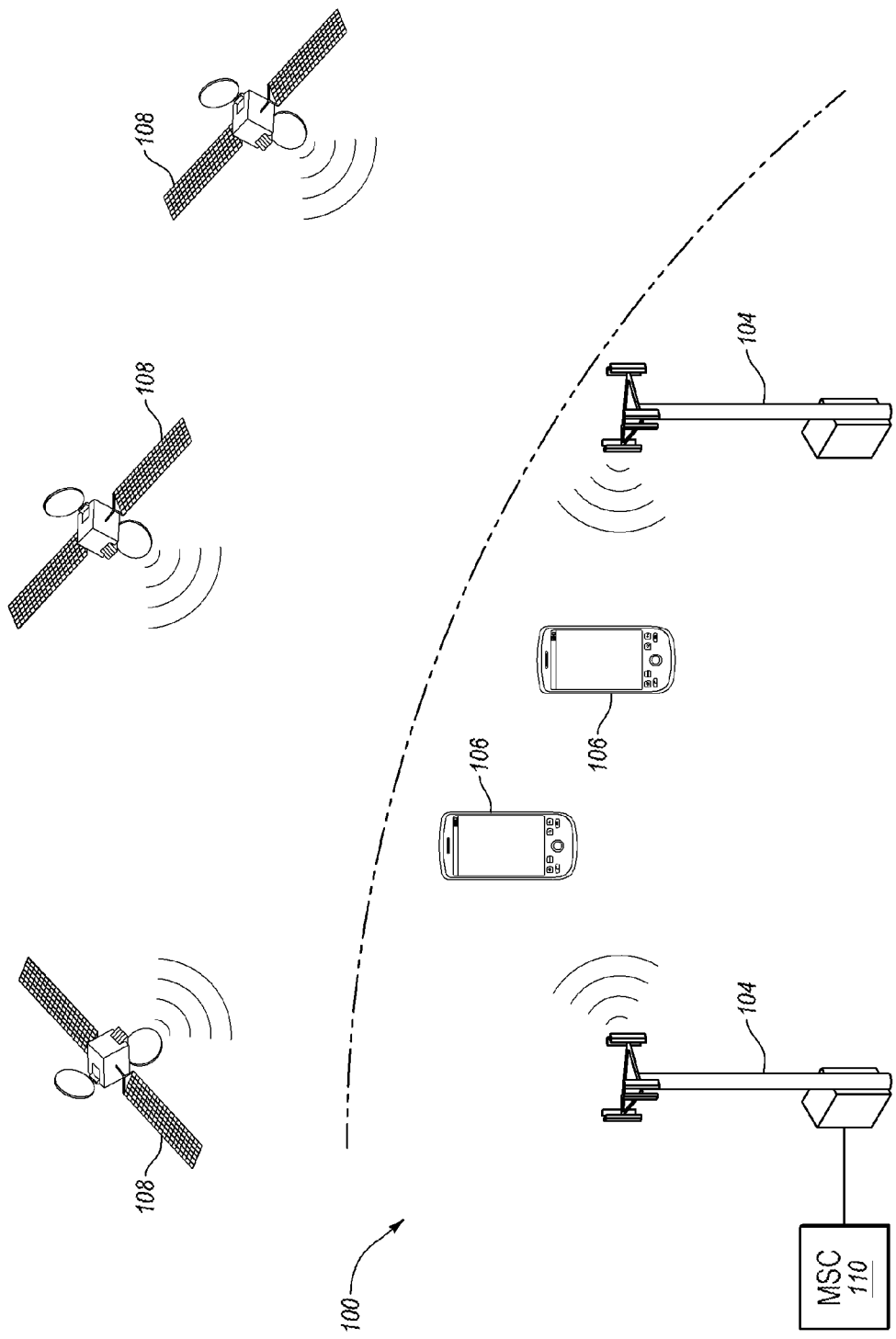
FIG. 1 illustrates an example wireless communication system.

According to some embodiments of the present disclosure, a peak-to-average power ratio (PAR) (also commonly referred to as "crest factor") of a signal may be reduced. A reduction in PAR may allow for an increased data rate of the signal as well as reduced power consumption used to communicate data via the signal.

As detailed below, in some embodiments, a PAR reduction module may be configured to receive an input signal. The PAR reduction module may be configured to compress an amplitude of the input signal (e.g., clip the amplitude of the input signal) to generate a compressed signal. The PAR reduction module may also be configured to compare the input signal and the compressed signal to generate an error signal that may indicate a distortion of the compressed signal with respect to the input signal. In some embodiments, the PAR reduction module may be configured to filter the error signal based on an in-band frequency range to generate an in-band error signal. The PAR reduction module may also be configured to filter the error signal based on an out-of-band frequency range to generate an out-of-band error signal. The in-band frequency range may correspond to an intended frequency range of the input signal and the out-of-band frequency range may correspond to a frequency range that may be outside of the intended frequency range of the input signal.

Additionally, in some embodiments, the PAR reduction module may be configured to determine an in-band distortion of an output signal generated by the PAR reduction module based on the input signal and a feedback of the output signal. In some embodiments, the in-band distortion may be determined based on an error vector magnitude (EVM) of the output signal with respect to the input signal. The PAR reduction module may also be configured to apply an in-band gain to the in-band error signal based on the in-band distortion.

In some embodiments, the PAR reduction module may also determine an out-of-band distortion of the output signal based on the feedback of the output signal. In some embodiments, the out-of-band distortion may be determined based on an adjacent channel leakage ratio (ACLR) of the output signal. Further, the PAR reduction module may apply an out-of-band gain to the out-of-band error signal based on the out-of-band distortion.

After applying the in-band gain to the in-band error signal and after applying the out-of-band gain to the out-of-band error signal, the PAR reduction module may be configured to combine the in-band and out-of-band error signals into a combined error signal. Additionally, the PAR reduction module may be configured to generate the output signal by combining the compressed signal with the combined error signal.

In some embodiments, the PAR reduction module may perform an optimization that may be based on and associated with the in-band distortion and the out-of-band distortion. The PAR reduction module may determine the in-band gain and/or the out-of-band gain based on the optimization. In some embodiments, the in-band and/or out-of-band gains may be adjusted based on the optimization such that the in-band distortion, out-of-band distortion, and PAR associated with the output signal may be within specified limits.

Therefore, the PAR reduction module may be configured to reduce the PAR associated with a signal. As discussed above, a reduced PAR may allow for increased data rates and/or reduced power consumption for transmission of data via signals. In some embodiments, the PAR reduction module may be implemented with respect to one or more components of a wireless communication system to improve the communication of information via the wireless communication system.

Embodiments of the present disclosure will be explained with reference to the accompanying drawings.

FIG. 1 illustrates an example wireless communication system 100 (referred to hereinafter as "system 100"), arranged in accordance with at least one embodiment described herein. The system 100 may be configured to provide wireless communication services to one or more terminals 106 via one or more access points 104. Although not expressly illustrated in FIG. 1, the system 100 may include any number of access points 104 providing wireless communication services to any number of terminals 106. Additionally, with respect to the use of substantially any plural and/or singular terms herein, those having skill in the art can translate from the plural to the singular and/or from the singular to the plural as is appropriate to the context and/or application The wireless communication services provided by the system 100 may include voice services, data services, messaging services, and/or any suitable combination thereof. The system 100 may include a Frequency Division Duplexing (FDD) network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, and/or some other wireless communication network. In some embodiments, the system 100 may be configured to operate as a second generation (2G) wireless communication network, a third generation (3G) wireless communication network, a fourth generation (4G) wireless communication network, and/or a Wi-Fi network. In these or other embodiments, the system 100 may be configured to operate as a Long Term Evolution (LTE) wireless communication network.

The access point 104 may be any suitable wireless network communication point that may provide wireless communication services to the terminal 106. The access point 104 may include, by way of example but not limitation, a base station, a remote radio head (RRH), a Node B, an evolved Node B (eNB), or any other suitable communication point. In some embodiments, a mobile switching center (MSC) 110 may be communicatively coupled to the access points 104 and may provide coordination and control for the access points 104.

The terminal 106 may be any device that may use the system 100 for obtaining wireless communication services and may also be referred to as a remote station, a mobile station, an access terminal, user equipment (UE), a wireless communication device, a cellular phone, or some other terminology. For example, a terminal 106 may include, by way of example and not limitation, a cellular phone, a smartphone, a personal data assistant (PDA), a laptop computer, a personal computer, a tablet computer, a wireless communication card, or any other similar device configured to communicate within the system 100.

A terminal 106 may or may not be capable of receiving signals from one or more satellites 108. In some embodiments, the satellites 108 may belong to a satellite positioning system such as the well-known Global Positioning System (GPS). Additionally, a terminal 106 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 106 is shown as receiving signals from multiple transmitting sources simultaneously, where a transmitting source may be an access point 104 or a satellite 108. In certain embodiments, a terminal 106 may also be a transmitting source. In general, a terminal 106 may receive signals from zero, one, or multiple transmitting sources at any given moment. Additionally, for simplicity, only two terminals 106 and two access points 104 are shown in FIG. 1; however, the system 100 may include any number of terminals 106 and access points 104.

Figure 2:
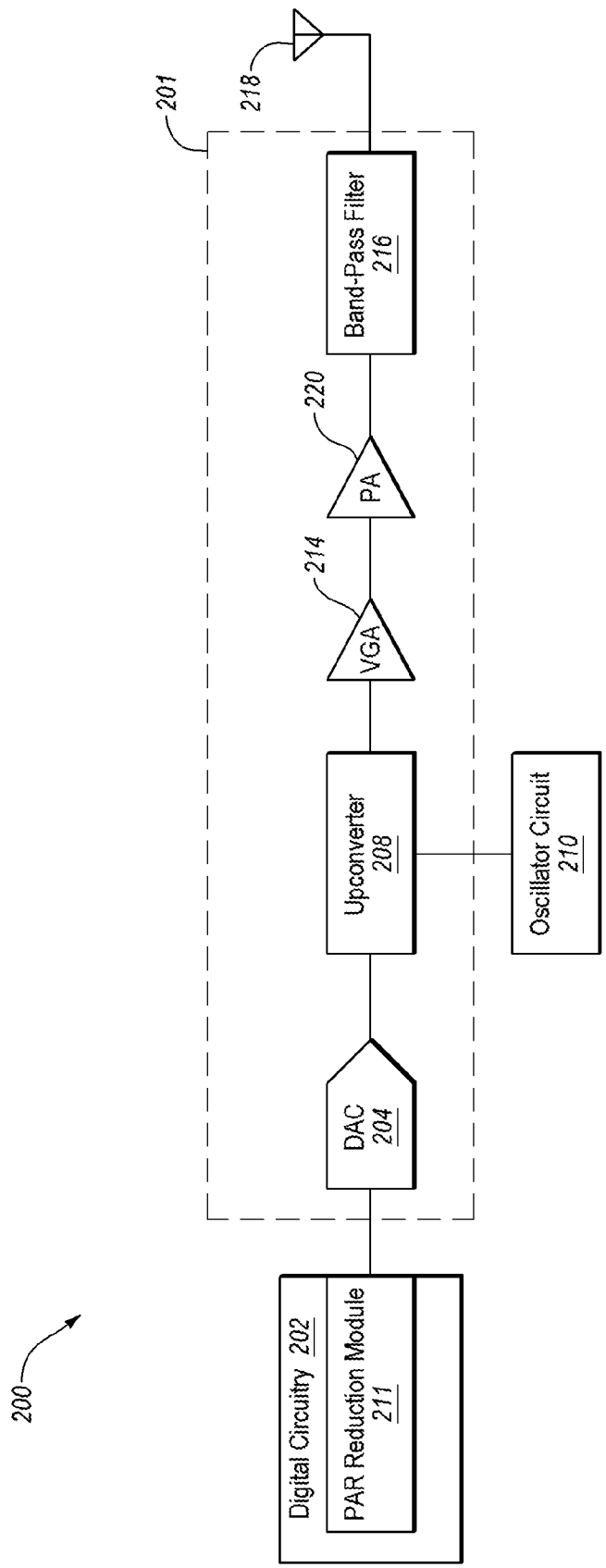
FIG. 2 illustrates a block diagram of selected components of an example transmitting and/or receiving element.

FIG. 2 illustrates a block diagram of selected components of an example transmitting and/or receiving element 200 (e.g., a terminal 106, an access point 104, or a satellite 108 of FIG. 1), arranged in accordance with at least one embodiment described herein. In the illustrated embodiment, the element 200 may include a transmit path 201, digital circuitry 202, and an oscillator circuit 210. In some embodiments, the element 200 may also include a receive path (not expressly depicted). Accordingly, depending on the functionality of the element 200, the element 200 may be considered a transmitter, a receiver, or a transceiver.

The element 200 may include digital circuitry 202 that may include any system, device, or apparatus configured to process signals and information for transmission via the transmit path 201. In some embodiments, the digital circuitry 202 may also be configured to process signals and information received via a receive path of the element 200. The digital circuitry 202 may include one or more microprocessors, microcontrollers, digital signal processors (DSP), application-specific integrated circuits (ASIC), a Field Programmable Gate Array (FPGA), or any other digital or analog circuitry configured to interpret and/or to execute program instructions and/or to process data and/or signals. In some embodiments, the program instructions and/or process data may be stored in memory.

The memory may include any suitable computer-readable media configured to retain program instructions and/or data for a period of time. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other tangible and/or non-transitory storage medium which may be used to carry or store desired program code in the form of computer-executable instructions or data structures and which may be accessed by the processor. Combinations of the above may also be included within the scope of computer-readable media. Computer-executable instructions may include, for example, instructions and data that cause a general purpose computer, special purpose computer, or special purpose processing device (e.g., a processor) to perform a certain function or group of functions.

The digital circuitry 202 may also include a PAR reduction module 211. As disclosed in further detail below with respect to FIGS. 3-5, the PAR reduction module 211 may be configured to reduce the PAR of signals that may be transmitted by the element 200 via the transmit path 201.

The transmit path 201 may include a digital-to-analog converter (DAC) 204. The DAC 204 may be configured to receive a digital signal from the digital circuitry 202 and may be configured to convert the received digital signal into an analog signal. The analog signal may then be passed to one or more other components of the transmit path 201, including an upconverter 208. The upconverter 208 may be configured to frequency upconvert the analog signal to a radio frequency based on an oscillator signal provided by the oscillator circuit 210.

The oscillator circuit 210 may be any suitable device, system, or apparatus configured to produce an analog waveform of a particular frequency for modulation or upconversion of an analog signal to an applicable radio frequency. In some embodiments, the oscillator circuit 210 may also be used for demodulation or downconversion of a received wireless communication signal. Accordingly, the oscillator circuit 210 may produce a clock signal that may be used for modulation or demodulation.

In some embodiments, the transmit path 201 may also include a variable-gain amplifier (VGA) 214 configured to amplify the upconverted signal for transmission of the upconverted signal. In these and other embodiments, the transmit path 201 may include a power amplifier (PA) 220 configured to receive the upconverted signal that may be amplified by the VGA 214. The PA 220 may also be configured to amplify the upconverted signal. The transmit path may additionally include a band-pass filter 216 configured to receive the upconverted signal amplified by the VGA 214 and the PA 220. The band-pass filter 216 may be configured to pass signal components of the upconverted signal in the band-of-interest (i.e., frequency range) of the signal, and remove out-of-band noise and undesired signals. The amplified and filtered signal may be received by the antenna 218, which may be configured to transmit the signal as a wireless communication signal.

Accordingly, the element 200 may be configured to transmit wireless communication signals. Additionally, the PAR reduction module 211 of the element 200 may be configured to reduce the PAR of the transmitted wireless communication signals, which may reduce the power used to transmit the wireless communication signals and/or increase the amount of information that may be transmitted via the wireless communication signals.

Modifications, additions, or omissions may be made to the element 200 without departing from the scope of the present disclosure. For example, the element 200 may include any number of components not expressly described and illustrated. Further, additional components may be communicatively coupled between the components expressly described and illustrated. Additionally, in some embodiments, one or more of the expressly illustrated and described components of the element 200 may be omitted. Also, although the PAR reduction module 211 is described as being included in the element 200, the PAR reduction module 211 may be included in any suitable system, apparatus, or device to reduce the PAR of signals. Accordingly, the PAR reduction module 211 is not limited to wireless communication applications.

Figure 3:
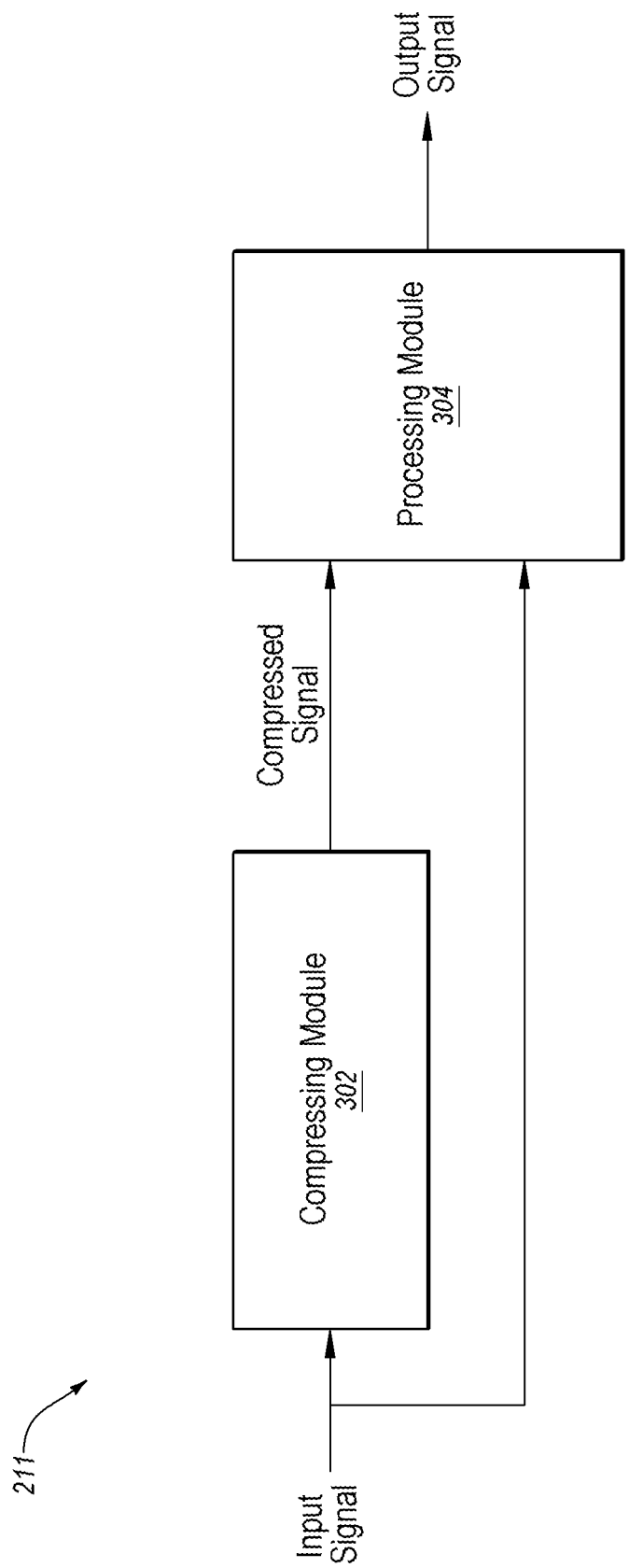
FIG. 3 illustrates a block diagram of an example embodiment of a peak-to-average power ratio (PAR) reduction module of FIG. 2.

FIG. 3 illustrates a block diagram of an example embodiment of the PAR reduction module 211 of FIG. 2, arranged in accordance with at least one embodiment described herein. The PAR reduction module 211 may be configured to receive an input signal and may include a compressing module 302 and a processing module 304 configured to perform operations with respect to the received input signal.

The input signal may be any suitable signal that may have its PAR reduced by the PAR reduction module 211. For example, in some embodiments, the input signal may be a digital baseband quadrature phase signal that may include an in-phase (I) component and a quadrature (Q) component such that the input signal may be a digital baseband IQ signal. In some embodiments, the input signal may include information that may be intended for transmission via a wireless communication signal.

The compressing module 302 may include any suitable system, apparatus, or device configured to receive the input signal and compress an amplitude of the input signal to generate a compressed signal of the input signal. For example, in some embodiments, the compressing module 302 may be configured to perform a clipping function to clip the amplitude of the input signal when the amplitude of the input signal exceeds a predetermined threshold. The predetermined threshold of the input signal may be based on a target PAR of the signal such that the input signal may be clipped when the amplitude of the input signal is such that the input signal would otherwise exceed the target PAR of the input signal. The clipping operation may be a hard clipping or may be a soft clipping operation.

The compressing module 302 may be communicatively coupled to the processing module 304 such that the processing module 304 may receive the compressed signal from the compressing module 302. The processing module 304 may also be configured to receive the input signal. The compression of the input signal to generate the compressed signal may cause distortion in the compressed signal.

Figure 4:
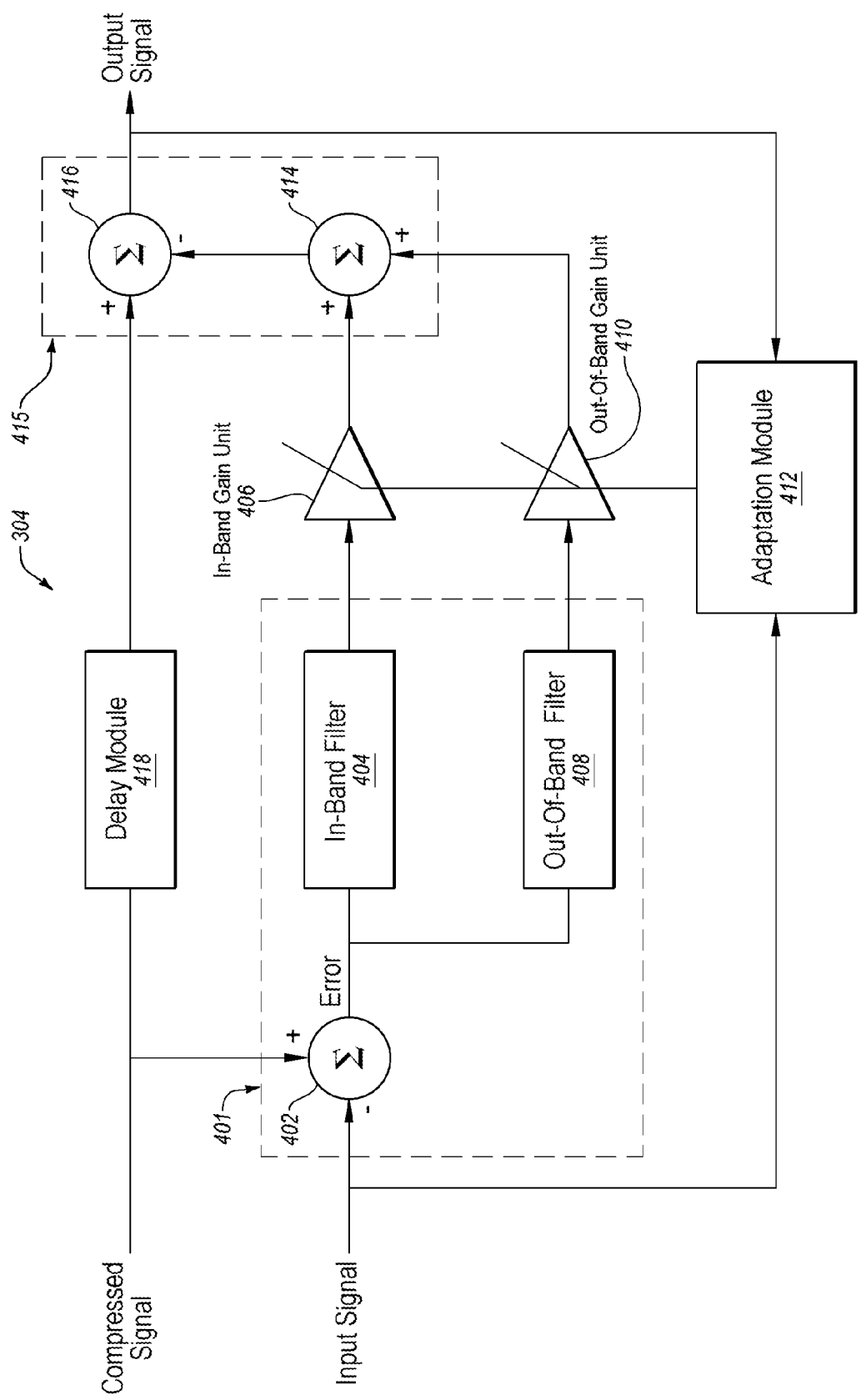
FIG. 4 illustrates a block diagram of an example embodiment of a processing module of FIG. 3.
Figure 5:
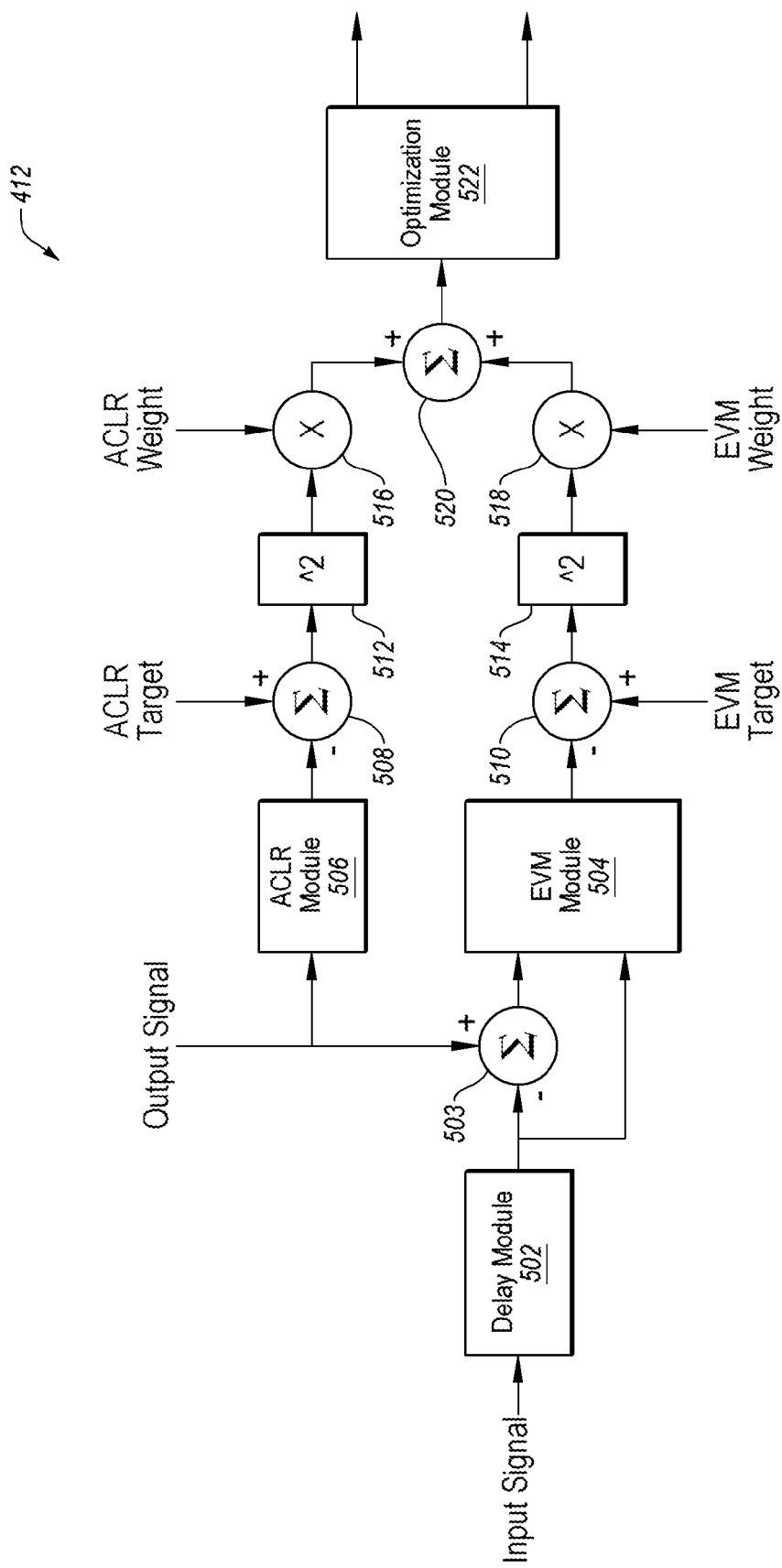
FIG. 5 illustrates a block diagram of an example embodiment of an adaptation module of FIG. 4.

As described in detail with respect to FIGS. 4 and 5, the processing module 304 may be configured to reduce the distortion in the compressed signal to generate an output signal that may have reduced distortion with respect to the compressed signal and that may also have a reduced PAR with respect to the input signal. As explained further below, the processing module 304 may be configured to reduce the distortion based on the compressed signal and the input signal. In some embodiments, the processing module 304 may be configured such that the PAR and the distortion of the output signal are within a desired range for the output signal. Accordingly, the compressing module 302 and the processing module 304 of the PAR reduction module 211 may be configured to produce an output signal with a reduced PAR while also reducing distortion that may be created during compression performed to reduce the PAR of the output signal with respect to the PAR of the input signal.

FIG. 4 illustrates a block diagram of an example embodiment of the processing module 304 of FIG. 3, arranged in accordance with at least one embodiment described herein. As mentioned above, the processing module 304 may be configured to receive the compressed signal from the compressing module 302 of FIG. 3 and may also be configured to receive the input signal. In some embodiments, the processing module 304 may include an error detection module 401 configured to receive the compressed signal and the input signal.

The error detection module 401 may include a comparator 402 configured to compare the compressed signal with the input signal to generate an error signal that may indicate distortion within the compressed signal with respect to the input signal. In some embodiments, a difference between the input signal and the compressed signal may indicate the distortion within the compressed signal with respect to the input signal. Therefore, in the illustrated embodiment, the comparator 402 may be configured to subtract the input signal from the compressed signal to generate the error signal such that the error signal may indicate the distortion of the compressed signal with respect to the input signal.

In some embodiments, the distortion within the compressed signal may be categorized as in-band distortion and out-of-band distortion. The in-band distortion may be distortion that occurs within the intended frequency range (referred to hereinafter as the "band-of-interest") of the output signal and the out-of-band distortion may be distortion that occurs outside of the band-of-interest of the output signal. For example, when the output signal is a digital baseband signal, the in-band distortion may be distortion that may occur within the baseband and the out-of-band distortion may be distortion that occurs outside of the baseband.

In some embodiments, quality of the output signal generated by the processing module 304 may be measured based on an error vector magnitude (EVM) of the output signal, which may indicate a deviation of locations of constellation points of the output signal with respect to their ideal locations. The EVM of the output signal may be affected by the amount of in-band distortion within the output signal. Additionally, the quality of the output signal may also be measured based on an adjacent channel leakage ratio (ACLR) of the output signal, which may indicate a ratio of the power of in-band frequencies of the output signal with respect to the power of out-of-band frequencies (e.g., frequencies adjacent to the in-band frequencies) within the output signal. The ACLR may be affected by the amount of out-of-band distortion within the output signal.

Therefore, in some embodiments, the error detection module 401 may be configured to generate an in-band error signal and an out-of-band error signal from the error signal output by the comparator 402 such that in-band distortion and/or out-of-band distortion of the output signal may be adjusted. In the illustrated embodiment, the error detection module 401 may include an in-band filter 404 and an out-of-band filter 408, each configured to receive the error signal from the comparator 402.

The in-band filter 404 may be any suitable filter configured to pass frequencies within the band-of-interest of the output signal and filter out frequencies substantially outside of the band-of-interest of the output signal. For example, when the output signal is a baseband signal, the band-of-interest may be the baseband. Therefore, the in-band filter 404 may include a low-pass filter such that the in-band filter 404 may output an in-band error signal that may include frequencies within the baseband and that may indicate in-band distortion of the compressed signal.

The out-of-band filter 408 may be any suitable filter configured to pass frequencies outside of the band-of-interest of the output signal and filter out frequencies substantially inside of the band-of-interest of the output signal. For example, when the output signal is a baseband signal, the out-of-band filter 408 may include a high-pass filter. Accordingly, the out-of-band filter 408 may output an out-of-band error signal with frequencies outside of the baseband and that may indicate out-of-band distortion of the compressed signal.

The processing module 304 may include an in-band gain unit 406 configured to receive the in-band error signal output by the in-band filter 404. The in-band gain unit 406 may be any suitable system, apparatus, or device configured to apply a gain to the in-band error signal to produce an adjusted in-band error signal. The gain applied by the in-band error signal may be referred to hereinafter as an "in-band gain" and may be less than, equal to, or greater than one such that the in-band gain unit 406 may attenuate, leave the same, or increase the power of the adjusted in-band error signal with respect to the in-band error signal received by the in-band gain unit 406.

The processing module 304 may also include an out-of-band gain unit 410 configured to receive the out-of-band error signal output by the out-of-band filter 408. The out-of-band gain unit 410 may be any suitable system, apparatus, or device configured to apply a gain to the out-of-band error signal to generate an adjusted out-of-band error signal. The gain applied by the out-of-band error signal may be referred to hereinafter as an "out-of-band" gain and may be less than, equal to, or greater than one such that the out-of-band gain unit 410 may attenuate, leave the same, or increase the power of the adjusted out-of-band error signal with respect to the out-of band error signal received by the out-of-band gain unit 410.

In some embodiments, the processing module 304 may also include a combining module 415 configured to combine the compressed signal with the adjusted in-band error signal and the adjusted out-of-band error signal. In some embodiments, the combining module 415 may include a distortion combining module 414 configured to receive the adjusted in-band error signal from the in-band gain unit 406 and configured to receive the adjusted out-of-band error signal from the out-of-band gain unit 410. The distortion combining module 414 may be configured to combine the adjusted in-band error signal and the adjusted out-of-band error signal to produce an adjusted error signal.

In some embodiments, the combining module 415 may also include an output signal module 416 configured to receive the compressed signal and the adjusted error signal. The output signal module 416 may be any suitable system, apparatus, or device configured to combine the adjusted error signal with the compressed signal such that the adjusted error signal may at least partially cancel out distortion (in-band and/or out-of-band distortion) within the compressed signal. Accordingly, the output signal module 416 may be configured to produce an output signal from the compressed signal and the adjusted error signal such that distortion of the output signal may be reduced with respect to distortion of the compressed signal. In the illustrated embodiment, the output signal module 416 may be configured to subtract the adjusted error signal from the compressed signal to produce the output signal such that the distortion of the compressed signal that may correspond to the adjusted error signal may be reduced or eliminated in the output signal.

In some embodiments, the processing that may occur between the error detection module 401 and the output signal module 416 may have a delay. Accordingly, in some embodiments, the processing module 304 may include a delay module 418 communicatively coupled to the output signal module 416. The delay module 418 may be configured to delay the compressed signal by substantially the same amount of time as the delay associated with the processing between the error detection module 401 and the output signal module 416. Therefore, the compressed signal (and its associated distortion) that may be received by the output signal module 416 may substantially correspond to the adjusted error signal also received by the output signal module 416.

In some embodiments, an adaptation module 412 of the processing module 304 may be configured to adjust the in-band gain and/or the out-of-band gain such that the in-band distortion and/or the out-of-band distortion of the output signal may be adjusted. In these or other embodiments, the adaptation module 412 may be configured to adjust the in-band gain and/or the out-of-band gain such that the in-band distortion and/or the out-of-band distortion of the output signal are within specified ranges. For example, in some embodiments, the adaptation module 412 may be configured to adjust the in-band gain of the in-band gain unit 406 such that the EVM of the output signal—which may be affected by the magnitude of the adjusted in-band error signal—may be within a target EVM range. In these or other embodiments, the adaptation module 412 may also be configured to adjust the out-of-band gain of the out-of-band gain unit 410 such that the ACLR of the output signal—which may be affected by the magnitude of the adjusted out-of-band error signal—may be within a target ACLR range.

In some embodiments, the adaptation module 412 may be configured to receive the input signal and the output signal. As described in further detail below with respect to FIG. 5, in some embodiments, the adaptation module 412 may be configured to determine the EVM of the output signal based on a comparison of the output signal with the input signal. The adaptation module 412 may be configured to compare the determined EVM of the output signal with a target EVM of the output signal and the adaptation module 412 may be configured to adjust the in-band gain based on the comparison.

Additionally, as also described in further detail with respect to FIG. 5, in some embodiments, the adaptation module 412 may be configured to determine the ACLR of the output signal. The adaptation module 412 may be configured to compare the determined ACLR of the output signal with a target ACLR of the output signal and the adaptation module 412 may be configured to adjust the out-of-band gain based on the comparison.

FIG. 5 illustrates a block diagram of an example embodiment of the adaptation module 412 of FIG. 4, arranged in accordance with at least one embodiment described herein. As mentioned above, the adaptation module 412 may be configured to receive the input signal and the output signal. Additionally, as mentioned above, the adaptation module 412 may be configured to determine the EVM and ACLR of the output signal.

With respect to the EVM of the output signal, in the illustrated embodiment, the adaptation module 412 may include a difference detection module 503 configured to receive the input signal and the output signal to determine a difference between the output signal and the input signal. The difference between the output signal and the input signal may indicate distortion between the output signal and the input signal such that the difference detection module 503 may generate an output error signal. In the illustrated embodiment, the difference detection module 503 may generate the output error signal by subtracting the input signal from the output signal. However, any other suitable operation may be performed to generate the output error signal indicating the distortion between the output signal and the input signal.

Additionally, as mentioned above, a delay may occur from when the processing module 304 receives the input signal and generates the output signal that may correspond with the received input signal. Therefore, in some embodiments, the adaptation module 412 may include a delay module 502 that may be configured to receive and delay the input signal such that the input signal received by the difference detection module 503 may substantially correspond with the output signal also received by the difference detection module 503.

The adaptation module 412 may also include an EVM module 504 configured to receive the output error signal and the input signal. The EVM module 504 may be configured to determine the EVM of the output signal with respect to the input signal based on the input signal and the output error signal. The EVM module 504 may determine the EVM of the output signal using any suitable procedure for calculating EVM based on the output error signal and the input signal. The EVM module 504 may be configured to communicate the EVM toward an EVM comparator 510 of the adaptation module 504.

The EVM comparator 510 may be any suitable system, apparatus, or device configured to compare the EVM output by the EVM module 504 with an EVM target to determine how close the EVM of the output signal is to the target EVM. The EVM comparator 510 may accordingly output an EVM comparison that may indicate how close the EVM of the output signal is to the target EVM. In some embodiments, the EVM target may be based on a desired range or specification requirement of EVM of the output signal. In the illustrated embodiment, the EVM comparator 510 may be configured to subtract the EVM of the output signal from the EVM target to compare the EVM of the output signal with the target EVM.

In some embodiments, the adaptation module 412 may include an EVM comparison squaring module 514 that may be configured to square the EVM comparison that may be output by the EVM comparator 510. Accordingly, the squared EVM may indicate a difference between the EVM of the output signal and the target EVM without regard to whether the difference is positive or negative.

The squared EVM may be received by an EVM weighting module 518 of the adaptation module 412, which may apply an EVM weight to the squared EVM. As described in more detail below, the results of the EVM operations may be combined with results of ACLR operations, and the in-band gain and/or the out-of-band gain may be adjusted based on the combined EVM and ACLR computation results such that the distortion of the output signal may be substantially within a desired range. In some embodiments, the EVM may have a higher or lower weight than the ACLR in determining and adjusting the in-band gain and/or the out-of-band gain. Accordingly, the EVM weight may be based on the amount of weight that may be given to EVM in determining and adjusting the in-band gain and/or the out-of-band gain.

The adaptation module 412 may also include a combining module 520 configured to receive the weighted EVM that may be output by the EVM weighting module 518. The combining module 520 may be configured to combine the weighted EVM with a weighted ACLR that may be determined as described below. Accordingly, the combining module 520 may be configured to output a combined distortion indicator that may include both in-band and out-of-band distortion indicators (e.g., weighted EVM and ACLR results).

With respect to ACLR, the adaptation module 412 may also include an ACLR module 506 configured to receive the output signal and determine the ACLR of the output signal. The ACLR module 506 may determine the ACLR of the output signal using any suitable procedure for calculating ACLR. The ACLR module 506 may be configured to communicate the ACLR toward an ACLR comparator 508 of the adaptation module 412.

The ACLR comparator 508 may be any suitable system, apparatus, or device configured to compare the ACLR output by the ACLR module 506 with an ACLR target to determine how close the ACLR of the output signal is to the target ACLR. The ACLR comparator 508 may accordingly output an ACLR comparison that may indicate how close the ACLR of the output signal is to the target ACLR. In some embodiments, the ACLR target may be based on a desired range or specification requirement of ACLR of the output signal. In the illustrated embodiment, the ACLR comparator 508 may be configured to subtract the ACLR of the output signal from the ACLR target to compare the ACLR of the output signal with the target ACLR.

In some embodiments, the adaptation module 412 may include an ACLR comparison squaring module 512 that may be analogous to the EVM comparison squaring module 514 and that may be configured to square the ACLR comparison that may be output by the ACLR comparator 508. Accordingly, the squared ACLR output by the ACLR comparison squaring module 512 may indicate a difference between the ACLR of the output signal and the target ACLR without regard to whether the difference is positive or negative.

The squared ACLR may be received by an ACLR weighting module 516 of the adaptation module 412. Similar to the EVM weighting module 518 weighting the squared EVM as described above, the ACLR weighting module 516 may be configured to apply an ACLR weight to the squared ACLR. The ACLR weight may be based on the amount of weight that may be given to ACLR in determining and adjusting the in-band gain and/or the out-of-band gain. The weighted ACLR may consequently be received by the combining module 520 and may be combined with the weighted EVM to generate the combined distortion indicator.

In some embodiments, the adaptation module 412 may include an optimization module 522 that may be configured to receive the combined distortion indicator from the combining module 520. The optimization module 522 may be configured to determine the in-band gain and/or the out-of-band gain based on the combined distortion indicator and any suitable optimization scheme. The optimization module 522 may be communicatively coupled to the in-band gain unit 406 and the out-of-band gain unit 410 (illustrated in FIG. 4) such that the optimization module 522 may adjust the in-band gain and/or the out-of-band gain based on the determined in-band gain and the determined out-of-band gain.

The optimization scheme may be any suitable optimization scheme configured to determine the in-band and/or out-of-band gains such that the distortion (in-band and/or out-of-band) of the output signal may be within a desired range. As described above, in some embodiments, the desired in-band and out-of-band distortion ranges of the output signal may be indicated by EVM and/or ACLR targets, respectively, of the output signal.

For example, in some embodiments, the optimization module 522 may be configured to perform a gradient optimization algorithm with respect to the combined distortion indicator and the in-band and/or out-of-band gains according to the following expression:

$$g(k+1)=g(k)-\mu \nabla f(x,g)$$

In the above expression "$g(k+1)$" may represent the determined gain (in-band or out-of-band, depending on which gain is being determined); "$g(k)$" may represent a previous gain; "$\mu$" may represent a step size parameter that may be used to control the speed of convergence of the gradient function; "$\nabla$" may represent the gradient operator; and "$f(x,g)$" may represent a cost function that may yield the combined distortion indicator, which may depend on the gain and the input signal.

The optimization module 522 may set the in-band and/or out-of-band gain based on the results of applying the optimization algorithm to the combined distortion indicator and the respective gain, which may accordingly adjust the EVM and/or ACLR of the output signal such that the EVM and/or ACLR may move substantially toward or within the respective target values of the EVM and ACLR.

Therefore, the adaptation module 412 may help substantially maintain the distortion of the output signal at a desired level. Modifications, additions, or omissions may be made to the PAR reduction module 211 and its associated components described with respect to FIGS. 2-5, without departing from the scope of the present disclosure. For example, although the optimization module 522 is described above as performing a gradient optimization, the present disclosure is not limited to the optimization module 522 performing optimization based on a gradient optimization algorithm. Additionally, the PAR reduction module 211 may be used with any appropriate application to reduce the PAR of a signal such that use of the PAR reduction module 211 is not limited to wireless communications. Additionally, the PAR reduction module 211 may include other components not expressly illustrated or described.

Figure 6:
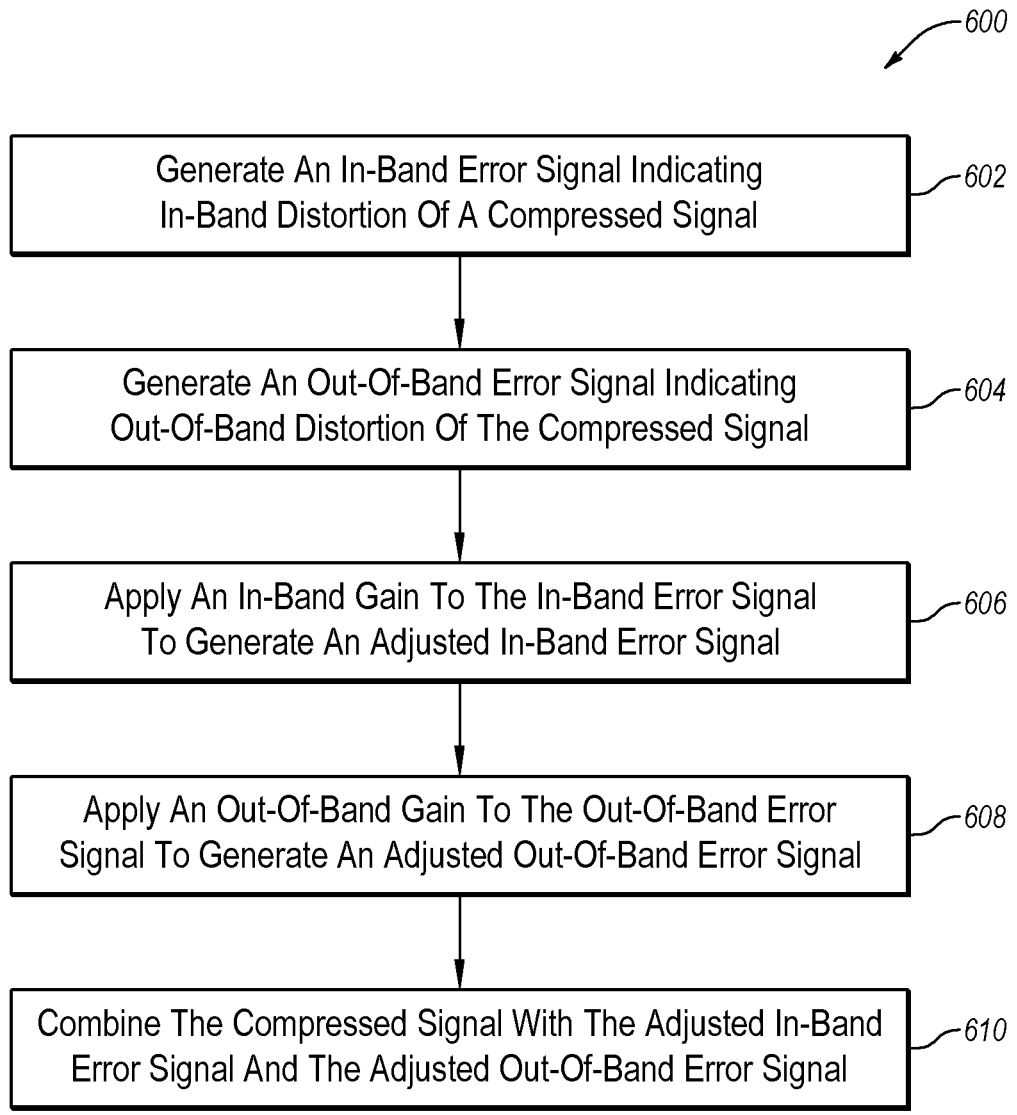
FIG. 6 is a flow chart of an example method of reducing the PAR of a signal.

FIG. 6 is a flow chart of an example method 600 of reducing the PAR of a signal, arranged in accordance with at least one embodiment described herein. The method 600 may be implemented, in some embodiments, by one or more components of a PAR reduction module, such as the PAR reduction module 211 and its associated components described with respect to FIGS. 2-5. Although illustrated as discrete blocks, various blocks may be divided into additional blocks, combined into fewer blocks, or eliminated, depending on the desired implementation.

The method 600 may begin at block 602 where an in-band error signal may be generated. The in-band error signal may indicate in-band distortion of a compressed signal with respect to an input signal from which the compressed signal is generated. In some embodiments, the in-band error signal may be generated by comparing the input signal with the compressed signal to generate an error signal and then filtering the error signal based on an in-band frequency range. At block 604, an out-of-band error signal may be generated. The out-of-band error signal may indicate out-of-band distortion of the compressed signal with respect to the input signal. In some embodiments, the out-of-band error signal may be generated by filtering the error signal based on an out-of-band frequency range.

At block 606, an in-band gain may be applied to the in-band error signal to generate an adjusted in-band error signal. At block 608, an out-of-band gain may be applied to the out-of-band error signal to generate an adjusted out-of-band error signal.

At block 610, the compressed signal may be combined with the adjusted in-band error signal and the adjusted out-of-band error signal to generate an output signal. The compressed signal may be combined with the adjusted in-band error signal and the adjusted out-of-band error signal, and the in-band gain and the out-of-band gain may be based on the output signal such that distortion (in-band and/or out-of-band) of the output signal may be reduced with respect to distortion of the compressed signal.

In some embodiments, in-band distortion of the output signal may be determined based on EVM of the output signal with respect to the input signal and/or out-of-band distortion of the output signal may be determined based on an ACLR of the output signal. In some embodiments, the in-band gain and/or out-of-band gain may be adjusted based on a comparison of the in-band distortion of the output signal with an in-band distortion target. In these or other embodiments, the in-band gain and/or the out-of-band gain may be adjusted based on a comparison of the out-of-band distortion of the output signal with an out-of-band distortion target. In these or other embodiments, the in-band distortion target may be based on a target EVM of the output signal and the out-of-band distortion target may be based on a target ACLR of the output signal.

One skilled in the art will appreciate that, for this and other processes and methods disclosed herein, the functions performed in the processes and methods may be implemented in differing order. For example, in some embodiments, the method 600 may include operations associated with compressing (e.g., clipping) the amplitude of the input signal to generate the compressed signal. Furthermore, the outlined steps and operations are only provided as examples, and some of the steps and operations may be optional, combined into fewer steps and operations, or expanded into additional steps and operations without detracting from the essence of the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. As mentioned above, and by way of example and not limitation, such computer-readable media may include tangible computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a special purpose or general purpose computer. Combinations of the above may also be included within the scope of computer-readable media.

Computer-executable instructions may include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the present disclosure.

What is claimed is:

1. A method of reducing a peak to average power ratio (PAR) of a signal comprising:
    comparing an input signal with a compressed signal to generate an error signal indicating distortion between the input signal and the compressed signal;
    filtering the error signal based on an in-band frequency range to generate an in-band error signal indicating in-band distortion of the compressed signal with respect to the input signal from which the compressed signal is generated;
    filtering the error signal based on an out-of-band frequency range to generate an out-of-band error signal indicating out-of-band distortion of the compressed signal with respect to the input signal;
    applying an in-band gain to the in-band error signal to generate an adjusted in-band error signal;
    applying an out-of-band gain to the out-of-band error signal to generate an adjusted out-of-band error signal; and
    combining the compressed signal with the adjusted in-band error signal and the adjusted out-of-band error signal to generate an output signal, the compressed signal being combined with the adjusted in-band error signal and the adjusted out-of-band error signal, and the in-band gain and the out-of-band gain being based on the output signal such that distortion of the output signal is reduced with respect to distortion of the compressed signal.

2. The method of claim 1, further comprising adjusting the in-band gain based on an in-band distortion target.

3. The method of claim 1, further comprising adjusting the out-of-band gain based on an out-of-band distortion target.

4. The method of claim 1, further comprising adjusting the in-band gain, the out-of-band gain, or both the in-band gain and the out-of-band gain based on an optimization scheme.

5. The method of claim 1, further comprising clipping an amplitude of the input signal to generate the compressed signal.

6. The method of claim 1, further comprising determining in-band distortion of the output signal based on an error vector magnitude (EVM) of the output signal with respect to the input signal and adjusting the in-band gain, the out-of-band gain, or both the in-band gain and the out-of-band gain based on the EVM.

7. The method of claim 1, further comprising determining out-of-band distortion of the output signal based on an adjacent channel leakage ratio (ACLR) of the output signal and adjusting the in-band gain, the out-of-band gain, or both the in-band gain and the out-of-band gain based on the ACLR.

8. The method of claim 1, further comprising filtering the error signal with a low-pass filter to generate the in-band error signal.

9. The method of claim 1, further comprising filtering the error signal with a high-pass filter to generate the out-of-band error signal.

10. A system of reducing a peak-to-average power ratio (PAR) of a signal comprising:
    an error detection module, comprising:
        a comparator configured to compare an input signal with a compressed signal to generate an error signal indicating distortion between the input signal and the compressed signal;
        an in-band filter configured to filter the error signal based on an in-band frequency range to generate an in-band error signal indicating in-band distortion of the compressed signal with respect to the input signal from which the compressed signal is generated; and an out-of-band filter configured to filter the error signal based on an out-of-band frequency range to generate an out-of-band error signal indicating out-of-band distortion of the compressed signal with respect to the input signal;

an in-band gain unit configured to apply an in-band gain to the in-band error signal to generate an adjusted in-band error signal;

an out-of-band gain unit configured to apply an out-of-band gain to the out-of-band error signal to generate an adjusted out-of-band error signal; and a combining module configured to combine the compressed signal with the adjusted in-band error signal and the adjusted out-of-band error signal to generate an output signal, the combining module configured to combine the compressed signal with the adjusted in-band error signal and the adjusted out-of-band error signal, the in-band gain unit configured to apply the in-band gain based on the output signal, and the out-of-band gain unit configured to apply the out-of-band gain based on the output signal such that distortion of the output signal is reduced with respect to distortion of the compressed signal.

11. The system of claim 10, further comprising an adaptation module configured to adjust the in-band gain based on an in-band distortion target.

12. The system of claim 10, further comprising an adaptation module configured to adjust the out-of-band gain based on an out-of-band distortion target.

13. The system of claim 10, further comprising an adaptation module configured to adjust the in-band gain based on an optimization scheme.

14. The system of claim 10, further comprising an adaptation module configured to adjust the out-of-band gain based on an optimization scheme.

15. The system of claim 10, further comprising a compressing module configured to clip an amplitude of the input signal to generate the compressed signal.

16. The system of claim 10, further comprising an adaptation module configured to determine in-band distortion of the output signal based on an error vector magnitude (EVM) of the output signal with respect to the input signal and configured to adjust the in-band gain, the out-of-band gain, or both the in-band gain and the out-of-band gain based on the EVM.

17. The system of claim 10, further comprising an adaptation module configured to determine out-of-band distortion of the output signal based on an adjacent channel leakage ratio (ACLR) of the output signal and configured to adjust the in-band gain, the out-of-band gain, or both the in-band gain and the out-of-band gain based on the ACLR.

18. The system of claim 10, wherein the in-band filter includes a low-pass filter and the out-of-band filter includes a high-pass filter.

* * * * *